(12) United States Patent
Momin et al.

(10) Patent No.: US 11,049,198 B1
(45) Date of Patent: Jun. 29, 2021

(54) DRIVE THRU ORDER FACILITATION SYSTEM AND METHOD OF USE

(71) Applicants: Mehrab Momin, Sugar Land, TX (US); Sultan Q Mukhi, Sugar Land, TX (US); Rehman Ali, Sugar Land, TX (US)

(72) Inventors: Mehrab Momin, Sugar Land, TX (US); Sultan Q Mukhi, Sugar Land, TX (US); Rehman Ali, Sugar Land, TX (US)

( * ) Notice: Subject to any disclaimer, the term of this patent is extended or adjusted under 35 U.S.C. 154(b) by 188 days.

(21) Appl. No.: 15/986,412

(22) Filed: May 22, 2018

Related U.S. Application Data

(60) Provisional application No. 62/512,793, filed on May 31, 2017.

(51) Int. Cl.
| | | |
|---|---|---|
| *A47F 10/06* | (2006.01) | |
| *G06Q 50/12* | (2012.01) | |
| *G06Q 30/06* | (2012.01) | |
| *G06K 9/00* | (2006.01) | |
| *H04L 29/08* | (2006.01) | |

(52) U.S. Cl.
CPC .......... *G06Q 50/12* (2013.01); *G06K 9/00832* (2013.01); *G06Q 30/0635* (2013.01); *G06K 2209/15* (2013.01); *H04L 67/306* (2013.01)

(58) Field of Classification Search
CPC ............. G06Q 10/087; G06Q 30/0207; G06Q 10/06315; G06Q 30/0641; G06Q 30/0635; G06Q 50/12
USPC .......................................................... 705/15
See application file for complete search history.

(56) References Cited

U.S. PATENT DOCUMENTS

| | | | |
|---|---|---|---|
| 7,102,496 B1 * | 9/2006 | Ernst, Jr. .......... | G08G 1/096725 180/167 |
| 9,008,370 B2 * | 4/2015 | Burry ................. | G06Q 30/0202 382/105 |
| 9,092,309 B2 * | 7/2015 | MacNeille .............. | G06F 17/00 |
| 9,563,998 B2 * | 2/2017 | Hoyos .................. | H05K 999/99 |
| 9,865,056 B2 * | 1/2018 | Bernal .................. | G06Q 10/00 |
| 9,946,906 B2 * | 4/2018 | Ricci .................. | G06Q 30/0208 |
| 10,098,027 B2 * | 10/2018 | Rad ..................... | H04L 43/0894 |
| 10,140,602 B2 * | 11/2018 | Kelly .................. | G07F 17/0078 |
| 10,289,989 B2 * | 5/2019 | Kelly ................. | G06Q 30/0633 |
| 10,303,893 B2 * | 5/2019 | Unagami ............ | G06F 21/6218 |
| 10,387,825 B1 * | 8/2019 | Canavor ................. | H04W 4/02 |
| 10,402,920 B2 * | 9/2019 | Fox ........................ | G06Q 50/12 |
| 10,445,672 B2 * | 10/2019 | Renfroe ............. | G06Q 30/0641 |
| 10,445,819 B2 * | 10/2019 | Renfroe .............. | G06Q 10/087 |
| 10,514,268 B2 * | 12/2019 | Yamaguchi ........ | G01C 21/3611 |

(Continued)

*Primary Examiner* — Andrew Joseph Rudy
(74) *Attorney, Agent, or Firm* — Richard Eldredge; Eldredge Law Firm

(57) ABSTRACT

A drive thru order facilitation system includes a network, having a server; a computing device; and a database; a sensor to scan an identifying feature of a vehicle; an order history platform accessible from the computing device, the order history platform having a new customer creation portal; and an existing customer profile development portal; the order history platform provides access to customer profiles; and the order history platform collects data relating to order history; the sensor is to communicate with the computing device; and the computing device is to correlate the identifying feature of the vehicle with one of the customer profiles.

12 Claims, 4 Drawing Sheets

(56) References Cited

U.S. PATENT DOCUMENTS

| | | | | |
|---|---|---|---|---|
| 10,657,344 B1* | 5/2020 | Tripathy | ............ | G06K 7/10881 |
| 2008/0275819 A1* | 11/2008 | Rifai | ...................... | G06Q 20/32 |
| | | | | 705/44 |
| 2015/0220991 A1* | 8/2015 | Butts | .................. | G06Q 30/0265 |
| | | | | 705/14.62 |

* cited by examiner

DRIVE THRU ORDER FACILITATION SYSTEM AND METHOD OF USE

BACKGROUND

1. Field of the Invention

The present invention relates generally to drive thru ordering systems, and more specifically, to a drive thru order facilitation system for tracking and recording data associated with individual customers.

2. Description of Related Art

Drive thru ordering systems are well known in the art and are effective means to order food from a vehicle. For example, FIG. 1 depicts a conventional drive thru system 101 having a vehicle 103 with a customer (not shown) driving up to a restaurant 105 and placing an order from a standard menu 107.

In FIG. 2, a flowchart 201 depicts the method of system 101. During use, the customer drives up to the menu and places an order, as shown with boxes 203, 205. The customer then proceeds to drive up to the restaurant 105 window to receive the order, as shown with box 207.

One of the problems commonly associated with system 101 is inefficiency. For example, many customers can take long periods of time to determine what to order from the menu, thereby slowing the flow of orders associated with system 101.

Accordingly, although great strides have been made in the area of drive thru ordering systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
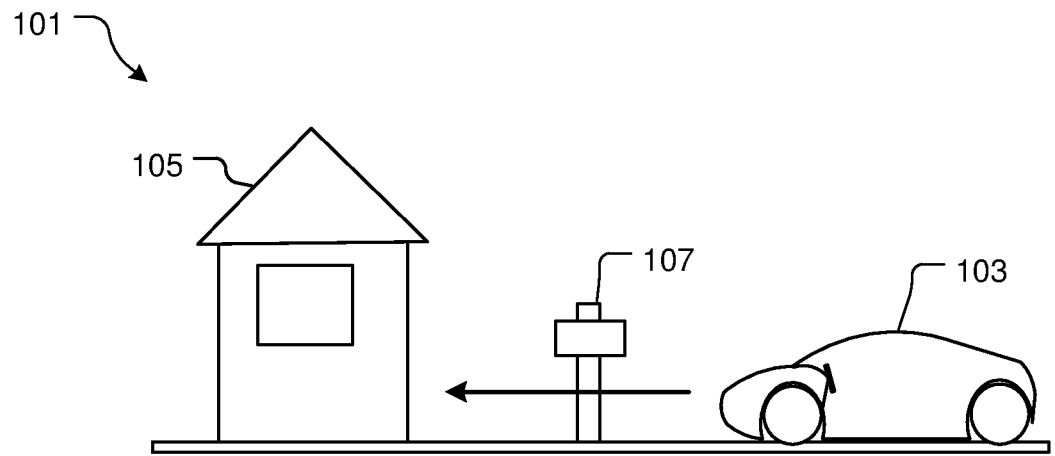
FIG. 1 is a simplified schematic of a common drive thru ordering system.
Figure 2:
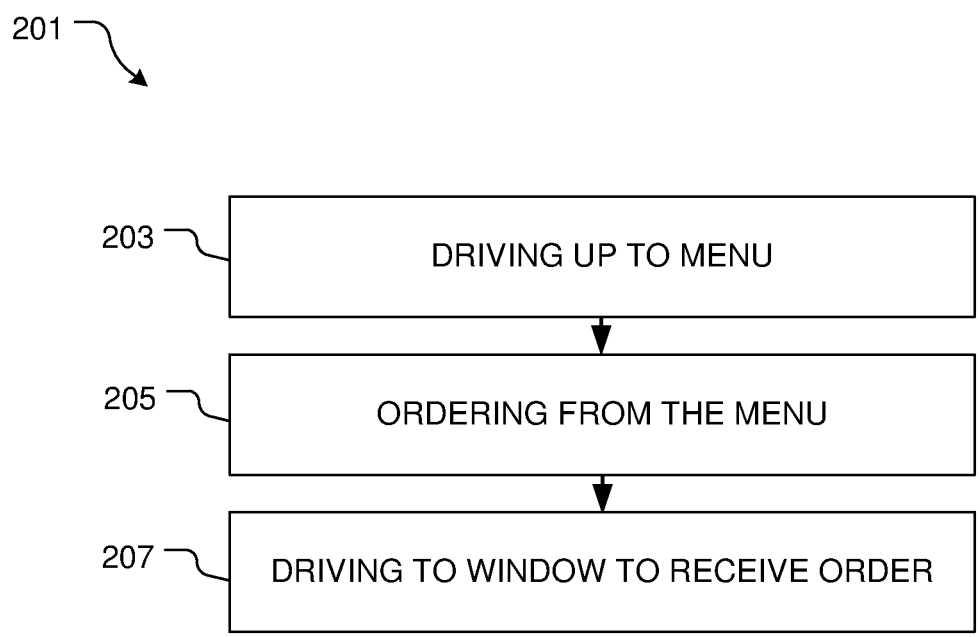
FIG. 2 is a flowchart of the method of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional drive thru ordering systems. Specifically, the present invention provides a means to improve efficiency and user experience associated with drive thru ordering systems. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
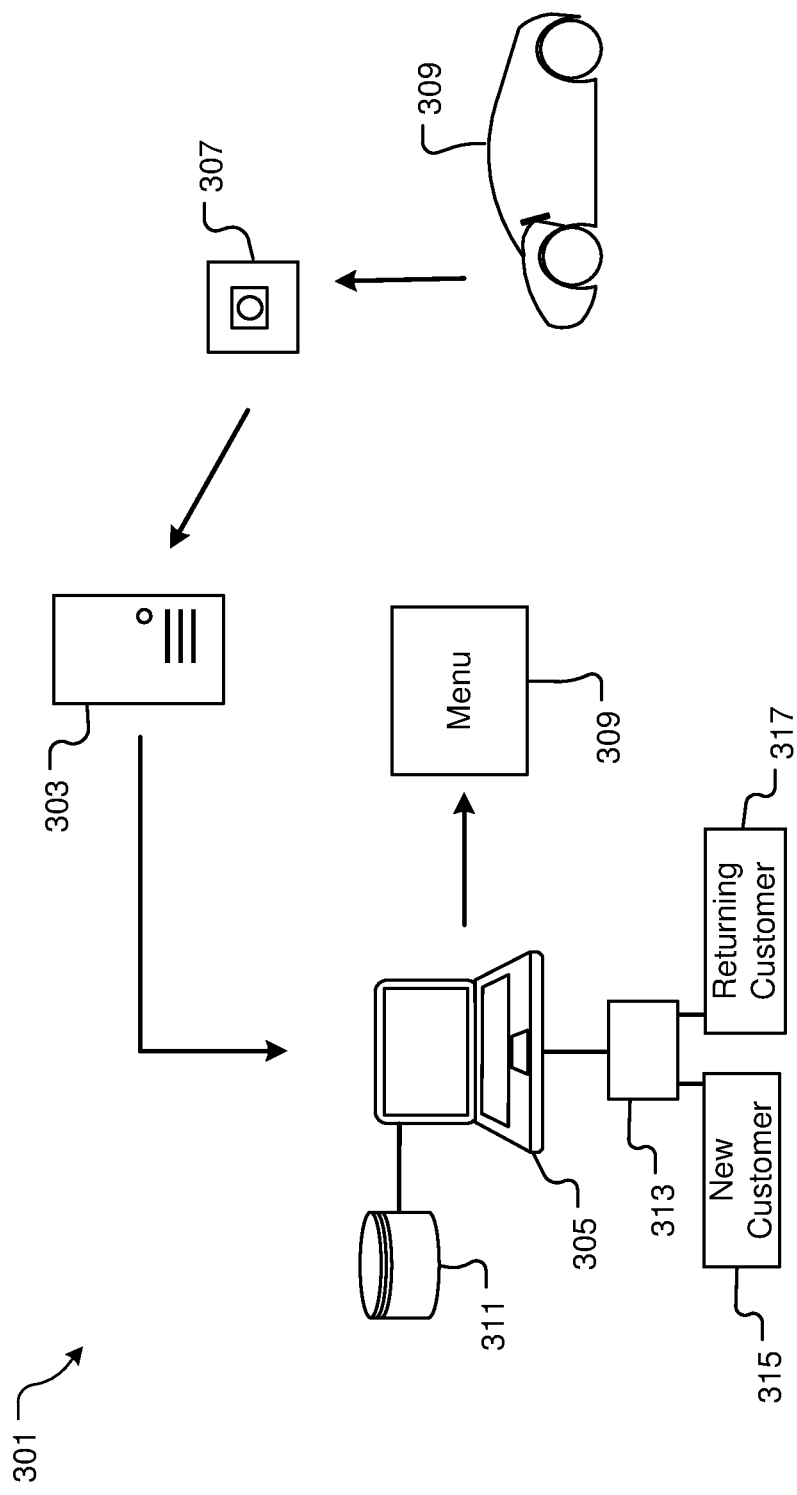
FIG. 3 is a simplified schematic of a drive thru order facilitating system in accordance with a preferred embodiment of the present application.

Referring now to the drawings wherein like reference characters identify corresponding or similar elements throughout the several views, FIG. 3 depicts a simplified schematic of a drive thru order facilitating system 301 in accordance with a preferred embodiment of the present application. It will be appreciated that system 301 overcomes one or more of the above-listed problems commonly associated with conventional drive thru ordering systems.

In the contemplated embodiment, system 301 includes a network having at least a server 303 and a computing device 305. System 301 further includes a sensor 307 in wired or wireless communication with server 303. In one embodiment, sensor 307 is a camera configured to take a picture of an identifying feature associated with a vehicle 309. In other embodiments, sensor 307 can be a scanner or other device configured to read an identifying feature associated with vehicle 309. It is contemplated that the identifying feature can be a license plate, a color/make/model of the vehicle, a vehicle occupant, RF emissions from the vehicle, or a sound associated with the vehicle. In addition, it is contemplated that an identifying feature could be an external feature added to the vehicle, such as a code or image.

In the preferred embodiment, server 303 includes appropriate logic software to evaluate the identifying feature to determine if the vehicle is associated with a repeat customer or new customer. Server 303 communicates wirelessly or wired with computer 305, wherein a database 311 holds information received from server 303 and inputted by one or more people or systems. Computer 305 provides access to an order history platform 313 with a new customer portal 315 and a returning customer portal 317. In the preferred embodiment, computer 305 is configured to receive information from server 303 relating to the identifying feature of the vehicle. If the identifying feature is determined to be associated with a new customer, computer 305 provides information to generate a custom menu 319 based on predetermined criteria to present to new customers. In the alternative, if the identifying feature is determined to be associated with a returning customer, database 311 is used to create a custom menu 311 based on order history associated with the customer.

It should be appreciated that menu 311 can be presented through a digital display, or alternatively, menu 311 can be presented through personnel who receive the information from computer 305. It should further be appreciated that database 311 is configured to constantly record, update, and create profiles associated with new customers and returning customers.

It should be appreciated that one of the unique features believed characteristic of the present application is the use of a scanner to identify an identifying feature associated with a vehicle, wherein the identifying information is then used to create a custom menu to be presented to the customer. It should also be appreciated that this feature allows drive thru locations to improve efficiency associated with their business and to personalize the customer's experience.

Figure 4:
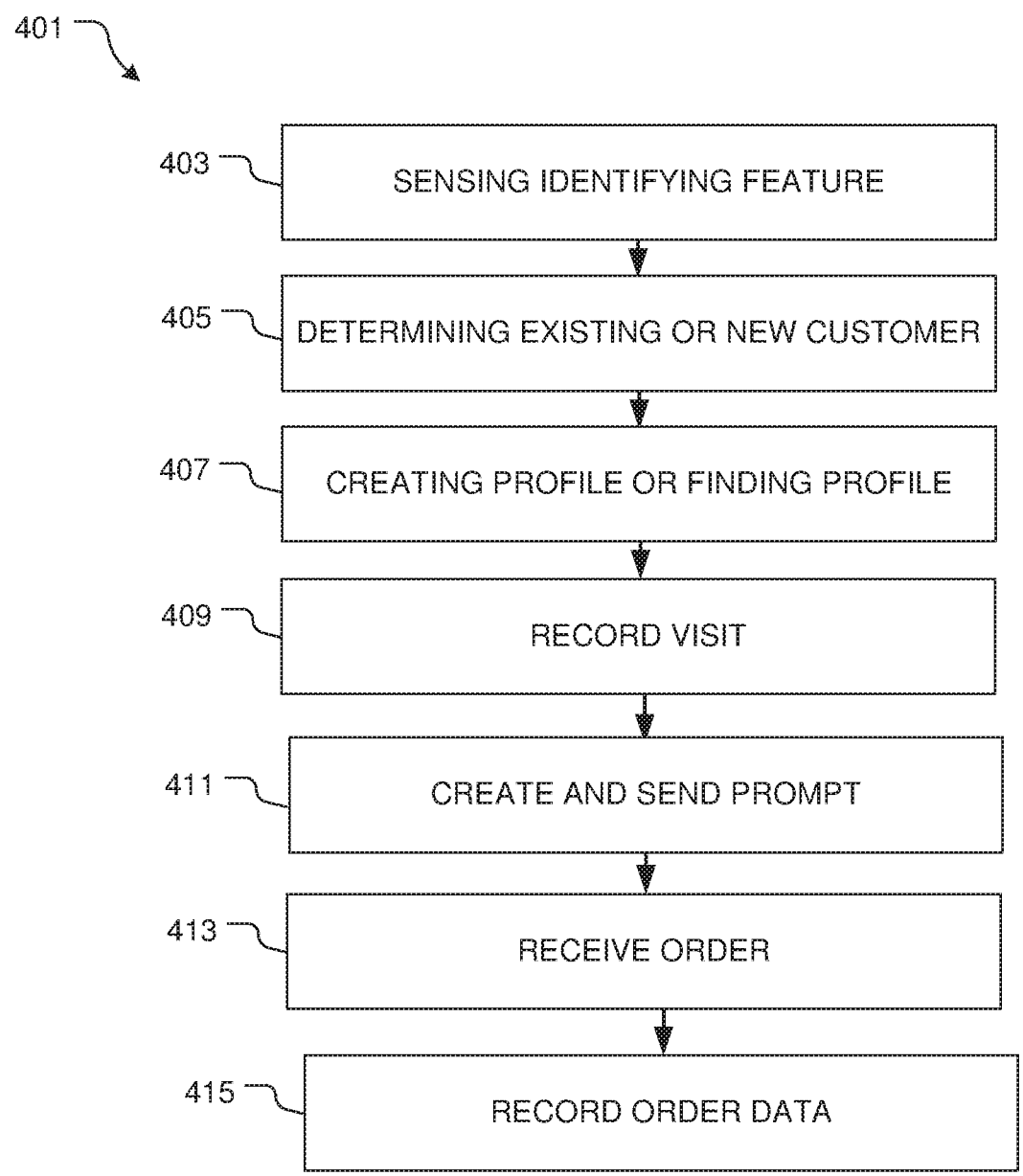
FIG. 4 is a flowchart of the method of FIG. 3.

In FIG. 4, a flowchart 401 depicts the method of system 301. An identifying feature is scanned/read/sensed by the sensor and the information is transmitted to the server, wherein the server runs logic to determine whether or not the identifying feature is associated with a new or returning customer, as shown with boxes 403, 405. If the server determines that the identifying feature is associated with a new customer, then a new profile is created within the database to be associated with the new customer, as shown with box 407. Alternatively, if the server determines that the identifying feature is associated with a returning customer, said returning customer's profile is retrieved from the database, as shown with box 407. Data associated with the visit, such as time and location, are recorded and saved to be associated with the correct profile, as shown with box 409. Based on information, such as whether or not the customer is new, the customer is returning, and data from the appropriate profile, a prompt is created to be presented to the customer, as shown with box 411. It should be appreciated that the prompt can be a customized menu presented on a display, or alternatively, can be presented by personnel associated with the service. It should further be appreciated that the prompt can include past orders, promotions, suggestions, or any other predetermined information. An order is then received, wherein data associated with the order is recorded and stored within the database for future use, as shown with boxes 413, 414. The customer then proceeds with receiving their order.

It should be appreciated that system 301 can include additional features such as the recording of a reaction to the prompt, either manually by personnel or via a sensor, e.g. camera, thereby providing additional feedback for storing within the database. In addition, it is contemplated that system 301 can incorporate a queue system, wherein a plurality of vehicles are scanned for identifying features, thereby providing a means to generate a plurality of prompts to be presented quickly and efficiently.

Figure 5:
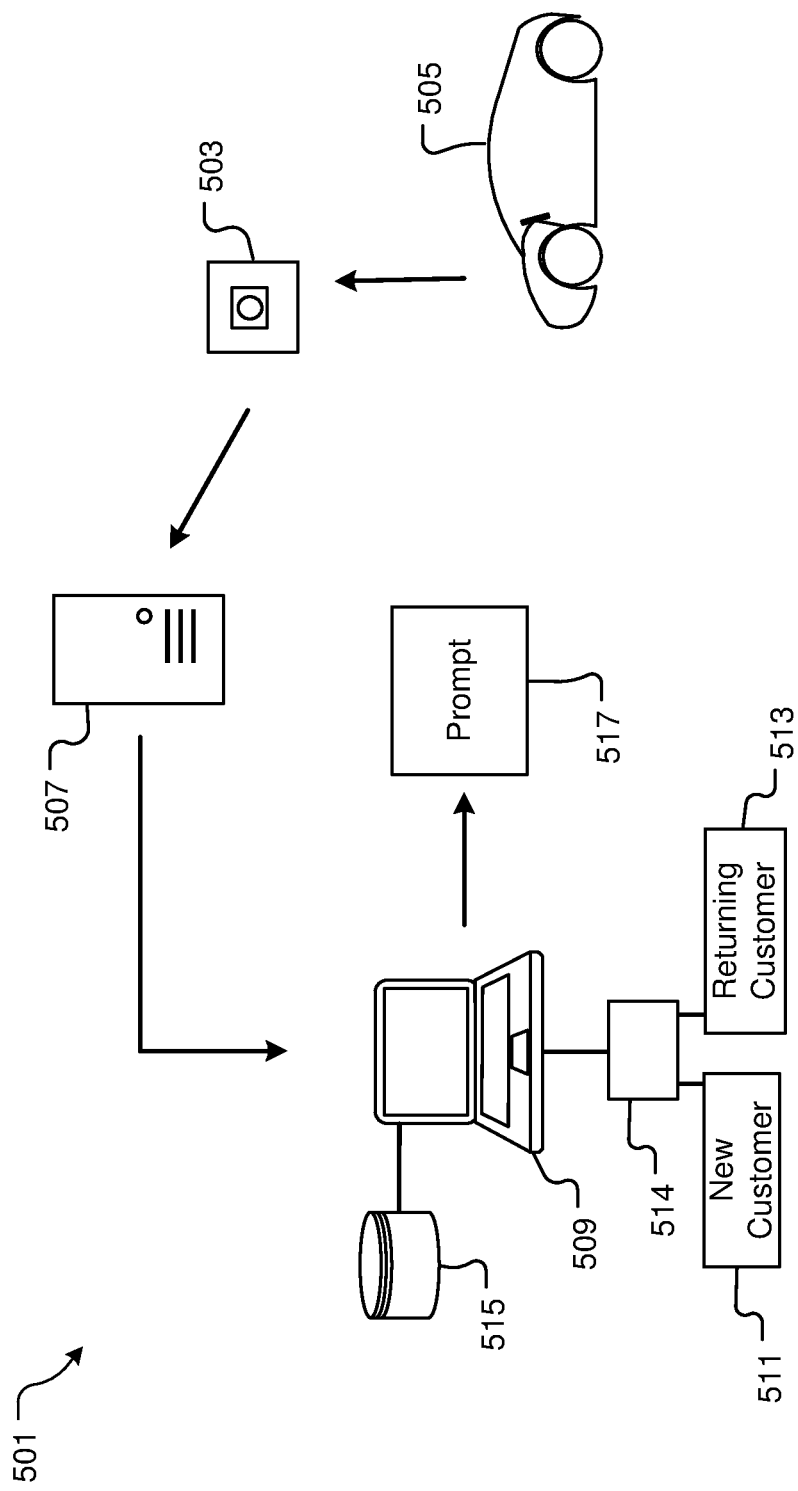
FIG. 5 is a simplified schematic of an alternative embodiment of a drive thru order facilitating system in accordance with the present application.

In FIG. 5, a simplified schematic depicts an alternative embodiment of a drive thru system 501, wherein system 501 includes the features discussed above and associated with system 301 and functions in the same or similar manner to system 301. System 501 includes a scanner 503 configured to read an identifying feature of a vehicle 505, wherein the information is transmitted to a server 507 and a computer 509. The information is used to find a returning customer profile 511 or create a new customer profile 513 within a platform 514 associated with a database 515. System 501 also includes a prompt 517 as it relates to any service in which a customer may drive up for the service. For example, system 501 can be used for vehicle servicing, wherein information retained within the database 515 relates to past vehicle service and therefore can be used to generate a prompt 517 that pertains to vehicle 505, thereby allowing a customer to select the desired service. As another example, system 501 could be used for pre-order meals and/or groceries, wherein the prompt generated pertains to past orders associated with the vehicle. It should therefore be understood that system 501 is appropriate for use with a wide variety of services.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A drive thru order facilitation system, comprising:
   a network, having:
      a server;
      a computing device; and
      a database;
   a drive thru display board in communication with the network;
   a camera configured to scan an identifying feature of a vehicle;
   an order history platform accessible from the computing device and stored within the database, the order history platform having:
      a new customer creation portal; and
      an existing customer profile development portal having previous orders created by an existing customer;
      wherein the order history platform provides access to a plurality of customer profiles, which in turn are displayed on the drive thru display; and
      wherein the order history platform collects data relating to order history;
   wherein the camera is configured to communicate with the computing device, which in turn identifies the vehicle as a new customer or the existing customer; and
   wherein the computing device is configured to correlate the identifying feature of the vehicle with one of the plurality of customer profiles.

2. The system of claim 1, wherein the identifying feature is a license plate.

3. The system of claim 1, wherein the identifying feature comprises one or more vehicle occupants as determined by identification software.

4. The system of claim 1, wherein the identifying feature is a code presented on an exterior of the vehicle.

5. The system of claim 1, wherein the order history platform is configured to automatically create a new profile upon determination of a new customer.

6. A method of facilitating ordering at a drive thru location, the method comprising:
provinding the system of claim 1;
sensing the identifying feature associated with the vehicle upon the vehicle entering a drive thru lane;
determining whether the identifying feature is associated with the existing customer profile as stored in the database;
presenting one or more previous orders as stored within the database on a display board within the drive thru lane; and
taking an order from a customer within the vehicle.

7. The method of claim 6, further comprising:
creating a new customer profile based on a determination that the identifying feature is not associated with the existing customer profile; and
providing a new customer incentive.

8. The method of claim 6, further comprising:
recording and saving information related to an order placed; and associated the information with an existing customer profile.

9. The method of claim 6, further comprising: surveying a customer for customer satisfaction.

10. The method of claim 6, further comprising:
recording a reaction of a customer associated with a customer's ordering experience.

11. The method of claim 6, wherein the identifying feature is a vehicle license plate.

12. The method of claim 6, further comprising:
collecting additional data associated with a customer to be saved within the existing customer profile.

* * * * *